Patented Aug. 2, 1949

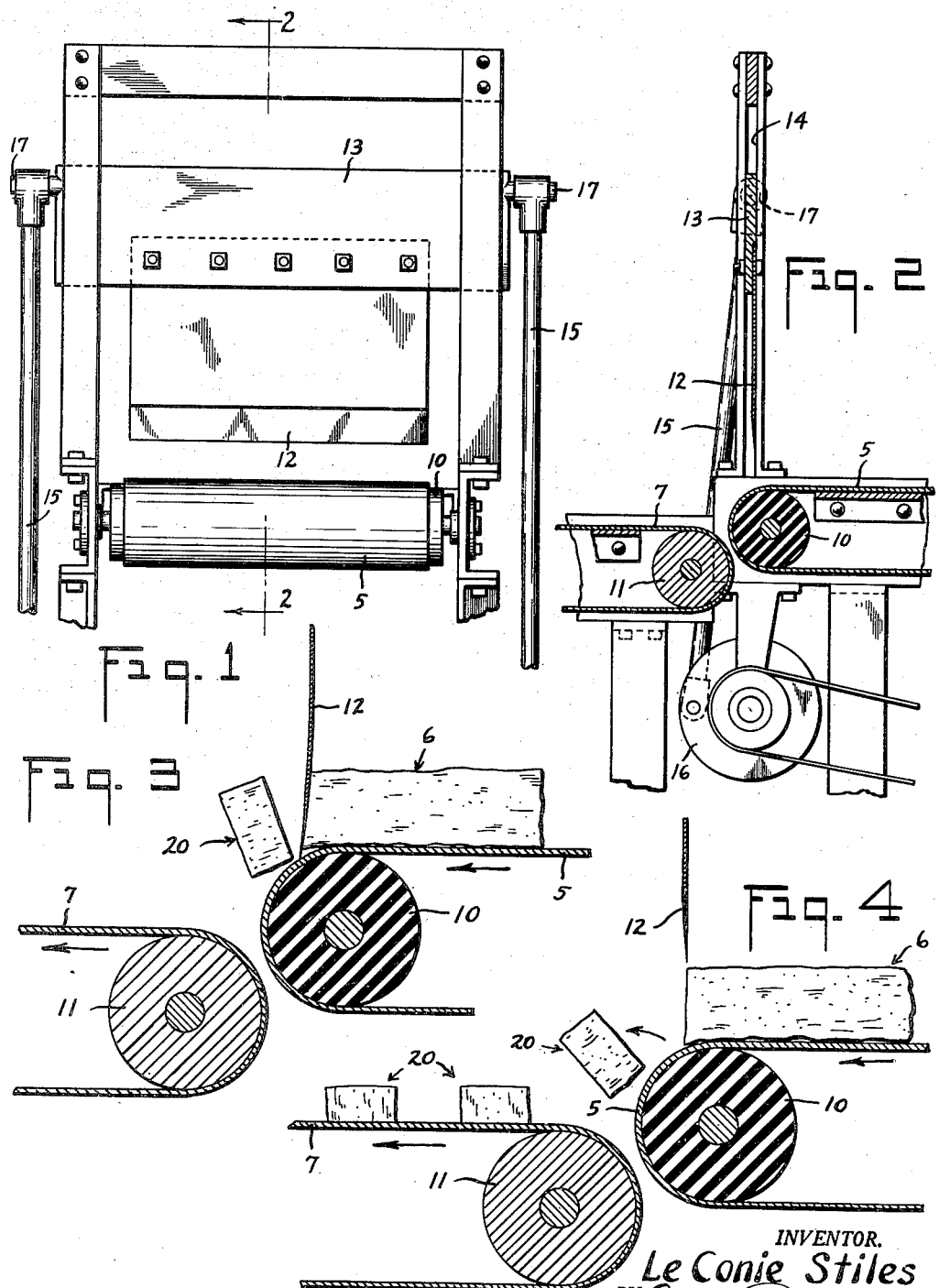

2,478,020

UNITED STATES PATENT OFFICE 2,478,020

SLICING MACHINE

Le Conie Stiles, Seattle, Wash.

Application January 2, 1948, Serial No. 70

6 Claims. (Cl. 107—21)

This invention relates to the art of slicing, and pertains especially to slicing machines of that character which I illustrate and describe in my pending application for Letters Patent of the United States filed November 13, 1945, Ser. No. 628,103, and which is to say a machine employing a reciprocally acting knife working in a path substantially at right angles to the path of travel of the upper run of a conveyor belt and by its reciprocating slicing, at spaced intervals of the length, an elongated body of material moving with the belt.

The machine of the present invention, as with that of my said co-pending application, particularly lends itself to the bakery art as a means of slicing an elongated body of rolled or folded dough as one procedural step in the production of various forms of pastry, as for example, butter-horns, bear-claws, and the like, and while it is believed that maximum clarity in an understanding of the present invention will perhaps be advanced by considering the present machine as one expressly applied to the slicing of a travelling dough body, the teachings of the invention obviously lend themselves to the slicing of other materials as well and I therefore intend that the term "dough" be construed in every instance of its occurrence as meaning any applicable substance.

Before proceeding with a detailed description of the invention, it may be well to here point out that a reciprocally movable slicing knife must perforce pass entirely through the traveling dough body in order to completely sever the slice from the following body of parent dough, and this severing action consequently brings the shearing edge of the knife against the dough-supporting surface of the conveyor belt. As a means of cushioning the thrust of the knife against the surface of the belt, the machine of my referred-to prior application causes the belt to pass over a roller of neoprene or relatively soft rubber and applies the knife such that its thrust is transmitted to the belt on a plane more or less radial to the roller. The belt gives slightly as the knife comes into contact therewith and greatly minimizes the punishment to which the belt would be subjected were the slicing knife to be made to work against a non-yielding belt. However, while this arrangement is quite effective in precluding a direct cuttting of the belt, it fails to completely answer the problem in that the belt, continually moving along its own path of progressive travel while the knife slides in a relatively fixed plane perpendicular thereto, is caused to be worn down and, ultimately, shredded by the scraping action of the knife's shearing edge. In an earlier patent issued to me under date of April 4, 1944, No. 2,346,637, provision was made for momentarily interrupting the travel of the feed belt in order to obviate this destructive scraping. In this patented system the frictional purchase of the knife's shearing edge was relied upon to momentarily stop the belt's travel and a spring-loading arrangement was introduced in compensation therefor to thereafter take up the lost-motion, but the consequence of the momentary stoppage was to transmit from the restrained belt to the knife a certain amount of lateral thrust. While effective in prolonging the life of the belt, it developed that the knife, in consequence of the lateral thrust, evidenced a tendency to bind in its slide-ways. Continued repetition of this slight binding action causes the sides of the slide-way to become worn, and even though this wear is slight and becomes noticeable only after prolonged usage, the knife ultimately develops a sloppy fit and chattering sets in. The present invention aims to overcome the disadvantages hereinabove referred to, and to provide an extremely simple and yet durable assembly of parts so arranged as to obviate any need for an interruption of the belt's travel and which will give trouble-free operation over long periods of usage with little destructive wear either upon the belt or upon the slide-way for the knife.

With the foregoing and other more particular objects and advantages in view, and which will appear and be understood in the course of the following description and claims, the invention consists in the novel construction and in the adaptation and combination of parts hereinafter described and claimed.

In the accompanying drawing:

Figure 1 is a fragmentary front elevational view portraying a slicing machine embodying the preferred teachings of the present invention.

Fig. 2 is a longitudinal vertical sectional view thereof on line 2—2 of Fig. 1.

Fig. 3 is a fragmentary view taken to an enlarged scale on a section line corresponding to that of Fig. 2 but illustrating the knife in the performance of its slicing action after having been moved through the down stroke of its reciprocatory travel, there being incorporated in the view a showing of a rolled body of sheeted dough and a slice cut therefrom; and Fig. 4 is a view similar to Fig. 3 with several slices having been cut from the dough body and portraying the knife in its upward stroke of reciprocation.

The machine of the present invention employs an endless belt denoted by the numeral 5 and which acts as a conveyor to give continuous travel to a rolled body 6 of sheeted dough, the belt working about head and tail rollers with the dough body being fed in sheet form onto the head end of the belt's upper run surface, usually direct from a sheeter which ordinarily is comprised of a pair of pressure-applying rollers driven in opposite directions of rotation. The sheet of dough, with an applied surfacing of a butter preparation frequently mixed with fruit or nuts, is rolled or folded in course of its longitudinal travel with the belt.

Leading off from the tail end of the conveyor belt 5 there is desirably provided a second endless belt 7 likewise working about head and tail rollers and placed, by preference, such that its upper run is stepped below the upper run of the principal conveyor 5. Only the tail roller for the upper-level belt 5 and the head roller for the lower-level belt 7 are shown in the drawing, and these two rollers are denoted 10 and 11, respectively.

In forming the roller 10, I produce the same from neoprene or a relatively soft rubber in order that the same will be made readily compressible under the pressure influence of the machine's slicing knife, and this knife, which works from above and is designated 12, extends transverse to the belt and is mounted for vertical reciprocatory action through means of a supporting crosshead 13 having its end edges journaled in slide-ways 14 made rigid with a machine framework, driver rods 15 driven from a crank disc 16 finding wrist connection by pins 17 with this cross-head to reciprocate the same.

The knife itself is produced from a thin sheet of highly resilient blade stock, and finds attachment only by its root end with the cross-head to have the major part of the blade depend therebelow and consequently permit the blade to flex more or less freely in a lateral direction transverse to the cross-head. The mounting of the blade is such as to position the same longitudinal to the axis of the tail roller 10 and in such rearwardly offset paralleling relation to a perpendicular raised from such axis as to place the plane of the knife's reciprocation more or less mid-way between the center of the tail roller and the extreme end limit of the belt's horizontal travel. As can be best seen from an inspection of Figs. 3 and 4, this placement of the knife offset beyond the vertical plane of the roller's axis, in conjunction with the knife's flexibility, allows a shearing stress to take effect without damage to the parts, the cutting edge of the knife during its momentary contact with the belt slipping off the receding surface of the belt along a path tangential to the latter. The velocity at which the knife moves in its initial shearing contact with the belt can, and preferably should, roughly correspend to the speed at which the belt progresses. The knife desirably has a sufficiently long stroke, and sufficient resistance to flexure, to accomplish a noticeable compression of the roller, and there is this advantage to be attained thereby, the elastic material composing the roller has a re-active kick-back as it is freed from the compressive influence of the knife and this spring action, transmitted to the dough slice 20, flips the slice off the surface of the belt to effectively overcome any tendency of the slice to stick to the belt.

The invention, the manner of its operation, and its accomplishments are believed to be clearly understood from the foregoing. While having illustrated and described the embodiment of the invention now preferred by me, minor departures therefrom may obviously be resorted to without departing from the spirit of the invention, and it is my intention that the hereto annexed claims be read with a scope commensurate with the broadest interpretation which the employed language permits.

What I claim is:

1. Mechanism for slicing an elongated body of dough transversely at spaced intervals of the length as the dough body moves in unison with a supporting conveyor belt and comprising, in combination with the belt, and with head and tail rollers supporting the belt, a transversely extending slicing knife supported for reciprocatory vertical movement above the tail roller and at the lower extreme of its travel finding contact with the belt, said knife being characterized in that the slicing edge thereof is readily deflectable in the direction of the dough body's travel by force of shearing stress transmitted from the moving belt to the knife.

2. Mechanism for slicing an elongated body of dough transversely at spaced intervals of the length as the dough body moves in unison with a supporting conveyor belt and comprising, in combination with the belt, and with head and tail rollers supporting the belt of which the tail roller is of a readily compressible nature, a transversely extending slicing knife supported for reciprocatory vertical movement above the tail roller and at the lower extreme of its travel finding contact with the belt, said knife being characterized in that the slicing edge thereof is readily deflectable in the direction of the dough body's travel by force of shearing stress transmitted from the moving belt to the knife.

3. Mechanism for slicing an elongated body of dough transversely at spaced intervals of the length as the dough body moves in unison with a supporting conveyor belt and comprising, in combination with the belt, and with head and tail rollers supporting the belt, a transversely extending slicing knife supported for reciprocatory vertical movement above the tail roller and at the lower extreme of its travel finding contact with the belt, the blade of said knife being composed of a thin-gauge resilient stock allowing the slicing edge of the knife to be deflected laterally upon its contact with the belt.

4. Mechanism for slicing an elongated body of dough transversely at spaced intervals of the length as the dough body moves in unison with a supporting conveyor belt and comprising, in combination with the belt, and with head and tail rollers supporting the belt of which the tail roller is of a readily compressible nature, a transversely extending slicing knife supported for reciprocatory vertical movement above the tail roller and at the lower extreme of its travel finding contact with the belt, the blade of said knife being composed of a thin-gauge resilient stock allowing the slicing edge of the knife to be deflected laterally upon its contact with the belt.

5. The structure of claim 3 in which the mounting of the knife is such that the same works in a plane removed toward the tail end of the belt well beyond a perpendicular raised from the axis of the tail roller.

6. Mechanism for slicing an elongated body of dough transversely at spaced intervals of the length as the dough body moves in unison with a supporting conveyor and comprising, in combination with the conveyor, a transversely extending slicing knife supported for reciprocatory vertical movement above the conveyor and at the lower extreme of its travel finding contact with the latter, said knife being characterized in that the slicing edge thereof is readily deflectable in the direction of the dough body's travel by force of shearing stress transmitted from the moving conveyor to the knife.

LE CONIE STILES.

REFERENCES CITED

The following references are of record in the file of this patent:

UNITED STATES PATENTS

| Number | Name | Date |
| --- | --- | --- |
| 653,060 | Betz | July 3, 1900 |
| 1,852,630 | Swinney | Apr. 5, 1932 |
| 2,043,684 | Walter | June 9, 1936 |